(No Model.) 4 Sheets—Sheet 1.
W. B. & G. H. WILLIAMSON.
CAN OPENER.
No. 378,349. Patented Feb. 21, 1888.
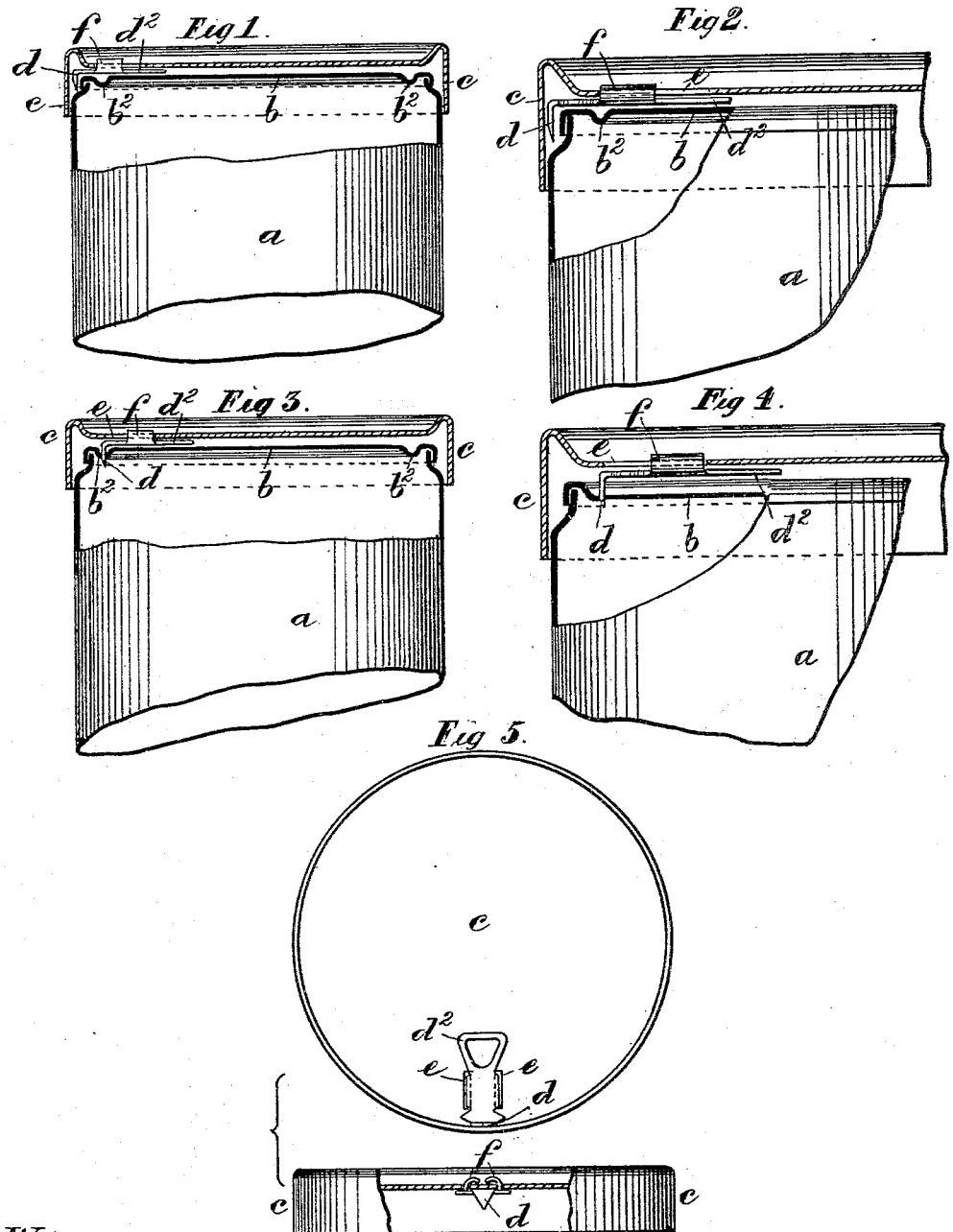

(No Model.) 4 Sheets—Sheet 2.
W. B. & G. H. WILLIAMSON.
CAN OPENER.
No. 378,349. Patented Feb. 21, 1888.
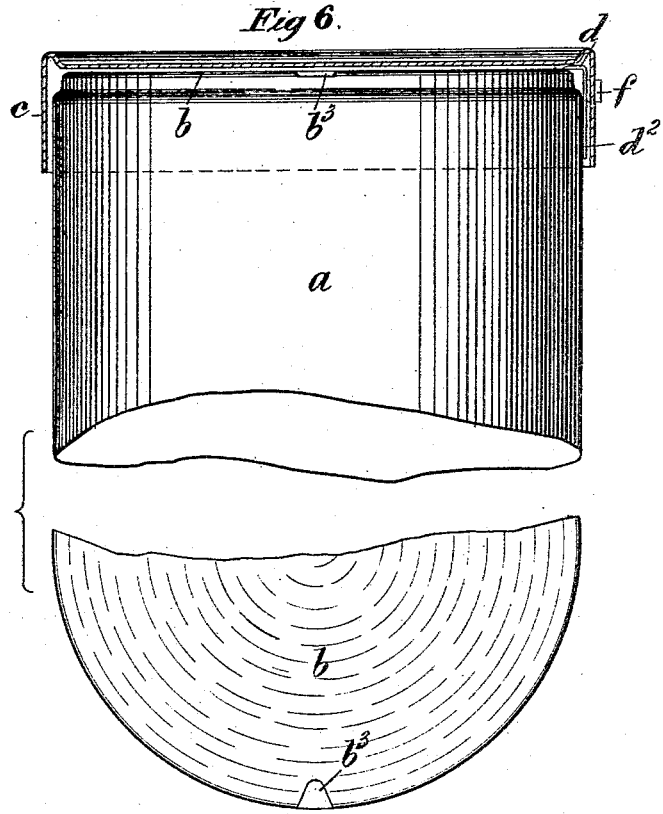
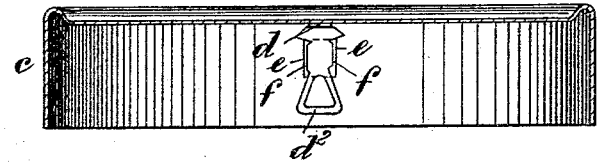
Witnesses:-
George Shaw.
Richard Skerrett.
Inventors:-
William Blizard Williamson
George Henry Williamson (No Model.) 4 Sheets—Sheet 3.
W. B. & G. H. WILLIAMSON.
CAN OPENER.
No. 378,349. Patented Feb. 21, 1888.
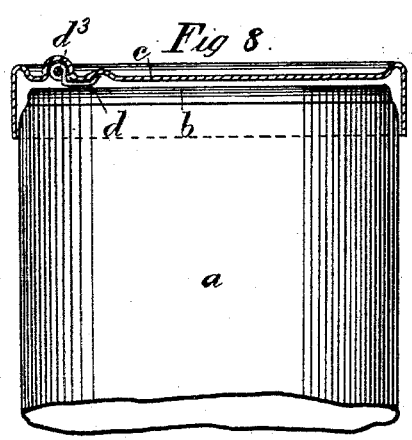
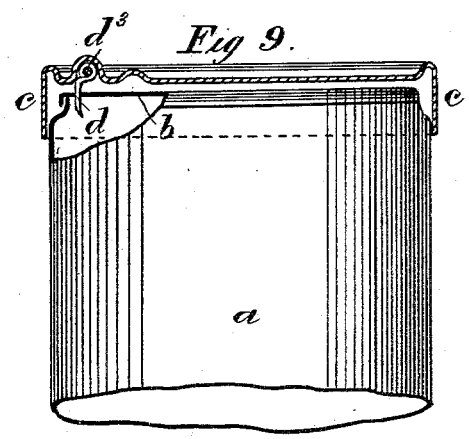
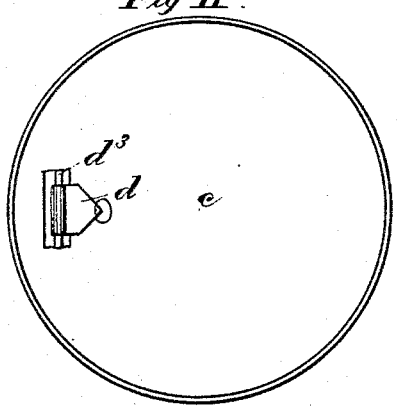
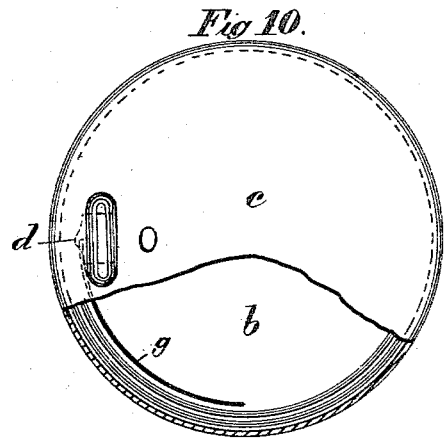
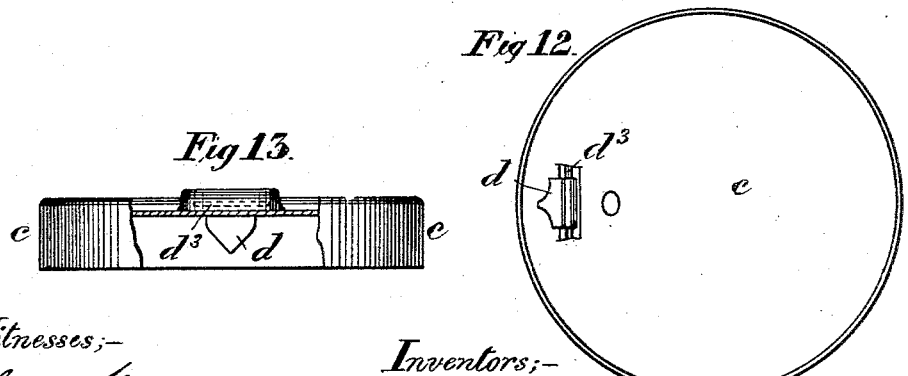
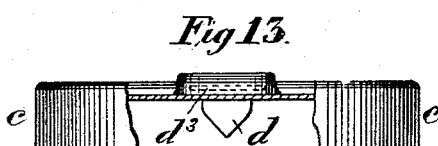
Witnesses:—
George Shaw.
Richard Skerrett.
Inventors:—
William Blezard Williamson,
George Henry Williamson.

(No Model.) 4 Sheets—Sheet 4.
W. B. & G. H. WILLIAMSON.
CAN OPENER.
No. 378,349. Patented Feb. 21, 1888
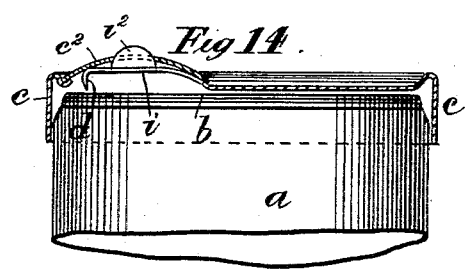
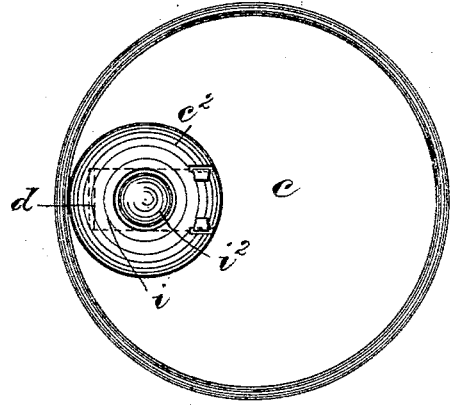
Witnesses:—
George Shaw
Richard Skerrett
Inventors:—
William Blizard Williamson
George Henry Williamson

UNITED STATES PATENT OFFICE.

WILLIAM BLIZARD WILLIAMSON AND GEORGE HENRY WILLIAMSON, OF WORCESTER, ENGLAND.

CAN-OPENER.

SPECIFICATION forming part of Letters Patent No. 378,349, dated February 21, 1888.

Application filed June 15, 1887. Serial No. 241,391. (No model.) Patented in England September 7, 1886, No. 11,378, and December 17, 1886, No. 16,614; in France June 2, 1887, No. 183,973; in Belgium June 2, 1887, No. 77,691, and in Canada July 11, 1887, No. 27,148.

*To all whom it may concern:*

Be it known that we, WILLIAM BLIZARD WILLIAMSON and GEORGE HENRY WILLIAMSON, (trading as W. B. WILLIAMSON & SONS,) of the city of Worcester, England, subjects of the Queen of Great Britain, have invented Improvements in Means for Opening Metallic Cans, (for which we have obtained patents in Great Britain, dated and numbered, respectively, September 7, 1886, and December 17, 1886, Nos. 11,378 and 16,614; in Canada dated July 11, 1887, No. 27,148; in France dated June 2, 1887, No. 183,973, and in Belgium dated June 2, 1887, No. 77,691,) of which the following is a specification.

Our invention has for its object to provide a cutter for opening metallic cans, boxes, or cases that will form a part or fixture of said vessel and be sold with it; and to this end the invention consists in the combination, with a loose cover adapted to protect the contents of a box or can after said box or can has been opened, of a cutter attached to and adjustable on said loose cover, whereby it is adapted to remove or cut away the tagger-tin top or other top of the box or case by rotating the loose cover thereon, as will be hereinafter fully described, and specifically pointed out in the claim, due reference being had to the accompanying drawings, wherein—

Figure 1 is an elevation, partly in section, of a box or can provided with a sliding cutter constructed in accordance with our invention; Fig. 2, an enlarged view of a portion of Fig. 1. In both of said figures the cutter is represented as being out of action; Fig. 3, a like view of Fig. 1, the cutter being represented in action; Fig. 4, a modification of the tagger top of the box or can. Fig. 5 represents the loose cover carrying the cutter detached from the box or can. Fig. 6 comprises a sectional elevation and a partial plan view showing another modification of the tagger top and location of the cutter. Fig. 7 is a detached sectional view of the cover shown in Fig. 6. Figs. 8 and 9 are sectional elevations, and Fig. 10 is a plan showing a hinged cutter. Figs. 11 and 12 are plan views of the under side of the loose cover shown in Figs. 8, 9, and 10. Fig. 13 is a broken side view of the cover shown in Fig. 12. Figs. 14 and 15, respectively, are a sectional elevation and a plan view of another modification.

Referring to the drawings, $a$ represents the body of the metallic box or can; $b$, the tagger top, and $c$ the loose cover. The open mouth of the box or can is constructed with a neck for receiving the tagger top in Figs. 1 to 5. $d\ d^2$ is a pointed sliding cutter situated on the under side of the loose cover $c$, $d$ representing the cutting-point of the cutter, the other end $d^2$ being looped to form a handle for putting the cutter into and out of action. The cutter $d\ d^2$ slides on the loose cover $c$ in the direction of a radius, the said cutter being secured to the cover and guided in its motion by the two parallel slots $e\ e$ in the cover, through which slots ear-pieces $f\ f$ are passed and turned back on the outer side of the cover, the turned-back ear-pieces $f\ f$ also acting as stops to the cutter. When the cutter $d\ d^2$ is pushed outward into the position shown in Figs. 1 and 2, its cutting-point $d$ is situated beyond the margin of the tagger top $b$, and pressure on the loose cover $c$ does not effect the cutting or puncturing of the tagger top, and the filled boxes or cans are sent out with the cutter in this position.

When it is desired to open the box or can, the loose cover $c$ is removed from the box and the cutter $d\ d^2$ is pressed toward the center of the cover into the position shown in Fig. 3. The loose cover is now replaced on the box, and the cutting-point $d$ of the cutter is now situated over the annular depression $b^2$ in the tagger top $b$. By pressing down the loose cover $c$ the cutting-point $d$ perforates the tagger top, and by turning the loose cover through a complete circle upon the top of the box the tagger top is cut out. Instead of making an annular depression, $b^2$, in the tagger top for the cutter to perforate, as represented in Figs. 1, 2, and 3, the tagger top may be made in the manner shown in Fig. 4—that is, the greater part of the tagger top $b$ is situated in a lower plane than the marginal part, the cutter perforating and cutting away the tagger top at the base of the shoulder of the marginal part, as seen in Fig. 4, where the cutter is shown in the position to cut the tagger top, as before described.

The sliding cutter may be placed on the inner face of the rim of the loose cover instead of on the inner face of the top of the loose cover, as shown in Figs. 6 and 7, the cutter being secured in place as before described. When the cutter is placed on the rim, a depression, $b^3$, is made in the tagger top, and when the cutter is pushed down in a position to cut, the cutting-point $d$ enters the depression $b^3$, and by rotating the loose cover $c$ the cutter-point $d$ cuts away the tagger top by an incision made in the side of the tagger top.

In Figs. 8, 9, 10, 11, 12, and 13 we have shown the cutter hinged to the loose cover. In these figures the cutter is shown as arranged for turning on a hinge-pin, $d^3$. When the cutter is turned up against the under side of the loose cover, as shown in Fig. 8, pressure upon said cover will not cause the cutter to puncture the tagger top. To open the box the hinged cutter is turned down to the position shown in Fig. 9 and the loose cover rotated, the cutter cutting the tagger top, as before described.

In Figs. 14 and 15 is shown another modification, in which the cutter is carried by a flat spring-arm. In order to conceal the cutter and its spring-arm, they are situated on the inside of a dome or raised part, $c^2$, of the cover. In the normal position of the cutter it does not touch the tagger top of the box. In order to cut the tagger top, the spring-arm $i$ is depressed by pressure upon the pusher-piece $i^2$, carried by the spring-arm $i$, and projecting through the dome or raised part $c^2$, causing the cutter to puncture the tagger top, and by keeping the spring-arm $i$ depressed and turning the loose cover the tagger top will be cut out, as before described.

Instead of a single cutter, two or more cutters may be applied to each cover, and it will be manifest that where two cutters are employed on the cover and placed opposite each other it will only be necessary to give the loose cover a half-turn to cut out the tagger top.

Having thus described our invention, what we claim is—

The combination, with a loose cover adapted to protect the contents of a box or can after said box or can has been opened, of a cutter attached to and adjustable on said loose cover, whereby it is adapted to remove or cut away the tagger-tin top or other top of the box or can by rotating the loose cover thereon, substantially as described.

WILLIAM BLIZARD WILLIAMSON. [L. S.]
GEORGE HENRY WILLIAMSON. [L. S.]

Witnesses:
GEORGE SHAW,
RICHARD SKERRETT.